US011161409B1

(12) United States Patent
Ghannam et al.

(10) Patent No.: US 11,161,409 B1
(45) Date of Patent: Nov. 2, 2021

(54) SYSTEMS AND METHODS TO SECURELY LIMIT DRIVABILITY OF A VEHICLE BY IMPAIRED USERS

(71) Applicant: Ford Global Technologies, LLC, Dearborn, MI (US)

(72) Inventors: Mahmoud Ghannam, Canton, MI (US); Mark Cuddihy, New Boston, MI (US); Brian Bennie, Sterling Heights, MI (US); Srinivasan Sundararajan, Ann Arbor, MI (US); Doug Thornburg, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/076,373

(22) Filed: Oct. 21, 2020

(51) Int. Cl.
*B60K 28/06* (2006.01)
*G06F 16/182* (2019.01)
*B60W 40/08* (2012.01)
*H04L 9/06* (2006.01)

(52) U.S. Cl.
CPC .......... *B60K 28/063* (2013.01); *B60W 40/08* (2013.01); *G06F 16/1837* (2019.01); *H04L 9/0618* (2013.01); *B60W 2040/0836* (2013.01); *H04L 2209/38* (2013.01)

(58) Field of Classification Search
CPC ..... B60K 28/06; B60K 28/063; B60W 40/08; B60W 2040/0836; G06F 16/1837; H04L 2209/38; H04L 9/0618
See application file for complete search history.

(56) References Cited

U.S. PATENT DOCUMENTS

| 9,884,628 | B1* | 2/2018 | Grant | B60W 50/0098 |
| 9,892,567 | B2 | 2/2018 | Binion et al. | |
| 2010/0012417 | A1* | 1/2010 | Walter | B60K 28/063 180/272 |
| 2013/0054090 | A1* | 2/2013 | Shin | B60K 28/06 701/36 |
| 2016/0311440 | A1* | 10/2016 | Gan | G08B 21/06 |
| 2017/0214675 | A1* | 7/2017 | Johnsrud | H04L 9/3236 |

(Continued)

OTHER PUBLICATIONS

Aaron M. Kessler, "Soon Cars May Take Away the Keys of a Drunken Driver", New York Times, Jun. 11, 2015, two pages.

*Primary Examiner* — Ryan W Sherwin
(74) *Attorney, Agent, or Firm* — Brandon Hicks; Eversheds Sutherland (US) LLP

(57) ABSTRACT

Systems and methods for securing limited drivability of a vehicle by impaired drivers using blockchain are provided. The vehicle system uses blockchain to protect and disclose such vehicle deactivation, prevent false enabling/disabling of a vehicle, and saves this information to a shared ledger. A sensor system located on the vehicle, e.g., alcohol interlock sensors, interior sensors, and exterior sensors, may have access to this information along with fleet managers, OEM, and/or users. For example, when the alcohol interlock sensor is activated, it transmits a test request. Subsequently, the other sensors may identify the request and look for a known person inside or in the proximity of the vehicle. In a similar manner, whether the test has been conducted, as well as the results of the test may be verified by the other nodes, e.g., sensors/modules in the vehicle. Upon confirmation that the driver is impaired, the vehicle may be deactivated.

14 Claims, 6 Drawing Sheets

(56) References Cited

U.S. PATENT DOCUMENTS

| | | | |
|---|---|---|---|
| 2017/0300898 A1* | 10/2017 | Campero | H04L 9/3236 |
| 2019/0092279 A1 | 3/2019 | Jarvis et al. | |
| 2019/0126935 A1 | 5/2019 | Phillips et al. | |
| 2019/0132350 A1* | 5/2019 | Smith | G06F 16/2379 |
| 2019/0279227 A1 | 9/2019 | Chantz | |
| 2020/0122731 A1* | 4/2020 | Vanhelle | B60K 28/063 |
| 2020/0195436 A1* | 6/2020 | Khan | G06F 21/45 |
| 2021/0061201 A1* | 3/2021 | Goluguri | H04L 9/3297 |

* cited by examiner

| Initial Ledger | | |
|---|---|---|
| Node | Any request to be registered and shared | Note |
| NHTSA Sensor | 00, 00, 00 000 | No tests |
| Interior Sensor | 00, 00, 00 000 | No tests |
| Exterior Sensor | 00, 00, 00 000 | No tests |
| Fleet manager | 00, 00, 00 000 | No tests |

Block0: Initial Conditions

FIG. 4A

| Ledger with Test Request Transaction | | |
|---|---|---|
| Node | Any request to be registered and shared | Note |
| NHTSA Sensor | 11, 00, 00 *(digitized code)* *100* | Test is requested and validate from a person in the test area |
| Interior Sensor | 11, 00, 00 *100* | |
| Exterior Sensor | 11, 00, 00 *100* | |
| Fleet manager | 11, 00, 00 *100* | |

Block1: Test-RFQ=11

FIG. 4B

| Ledger with Test Request Transaction | | |
|---|---|---|
| Node | Any request to be registered and shared | Note |
| NHTSA Sensor | 10, 00, 00 *(digitized code)* 000 | Test is requested but no person is confirmed in the test area |
| Interior Sensor | 10, 00, 00 000 | |
| Exterior Sensor | 10, 00, 00 000 | |
| Fleet manager | 10, 00, 00 000 | |

Block1: Test-REQ =10

FIG. 4C

| Ledger with Test Conduct Transaction | | |
|---|---|---|
| Node | Any request to be registered and shared | Note |
| NHTSA Sensor | 11, 11, 00 *(digitized code)* 110 | Test is conducted and validate from other sensors |
| Interior Sensor | 11, 11, 00 110 | |
| Exterior Sensor | 11, 11, 00 110 | |
| Fleet manager | 11, 11, 00 110 | |

Block2: Test-REQ =11

FIG. 4D

| Ledger with Test Result Transaction | | |
|---|---|---|
| Node | Any request to be registered and shared | Note |
| NHTSA Sensor | 11,11,11 100 110 111 | Test requested and verified, 100 |
| Interior Sensor | 11,11,11 100 110 111 | Conducted and verified, 110 |
| Exterior Sensor | 11,11,11 100 110 111 | Results sent and authenticated, 111 |
| Fleet manager | 11,11,11 100 110 111 | |

Block3:
Test-REQ =11

FIG. 4E

SYSTEMS AND METHODS TO SECURELY LIMIT DRIVABILITY OF A VEHICLE BY IMPAIRED USERS

BACKGROUND

The National Highway Traffic Safety Association (NHTSA) has proposed an inhibited driver sensor, developed by NHTSA, for incorporation into an automobile. This sensor would determine if the driver is impaired, e.g., inebriated, separate from any other vehicle systems and may send a message to the vehicle if the driver is impaired. The vehicle would then receive this message and prevent the driver from operating the vehicle in an impaired state. For example, this would introduce a single-source command, originating from outside the vehicle's electrical system, which would disable the vehicle. This introduces a potential threat to the vehicle from outside sources.

Therefore, there exists a need for a robust method of verifying that the signal regarding an impaired driver sensor is genuine and a robust method of deactivating the vehicle in order to prevent false deactivation. It is with respect to these and other considerations that the disclosure made herein is presented.

BRIEF DESCRIPTION OF THE DRAWINGS

FIGS. 4A to 4E illustrate an exemplary method for updating a blockchain ledger in accordance with the principles of the present disclosure.

DETAILED DESCRIPTION

Overview

Figure 1:
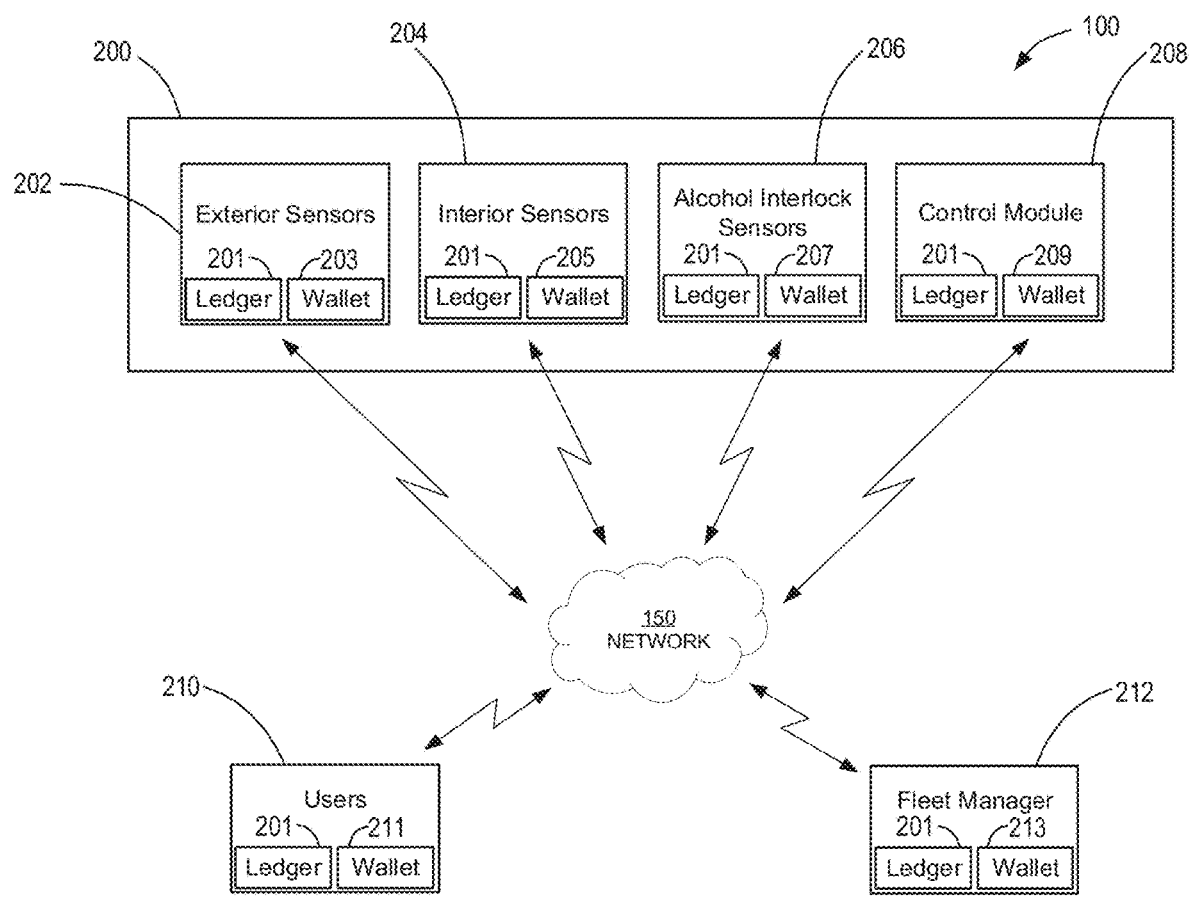
FIG. 1 illustrates a system for securing limited drivability of a vehicle by impaired drivers using a blockchain mode of operation in accordance with the principles of the present disclosure.

Systems and methods for securing limited drivability of a vehicle by impaired drivers using a blockchain mode of operation are provided. For example, a vehicle system uses blockchain to protect and disclose such vehicle deactivation, prevent false enabling/disabling of a vehicle, and/or saves this information to a shared ledger. A sensor system located on the vehicle, e.g., alcohol interlock sensors, interior sensors, and exterior sensors, may have access to this information along with fleet managers, OEM, and/or users. For example, when the alcohol interlock sensor is activated, it transmits a test request. Subsequently, the other sensors may identify the request and look for a known person inside or in the proximity of the vehicle. In a similar manner, whether the test has been conducted, as well as the results of the test may be verified by the other nodes, e.g., sensors/modules in the vehicle. Thus, the system prevents unauthorized individuals or groups from changing requested tests, wrong conduction, or sending false results, and ensures that the person that completed the test remains in the driver seat during vehicle operation. Moreover, the system may support fleet management through an authenticated method with least efforts, and improves safety by reducing the number of impaired drivers on road.

In addition, the system provides real-time history of vehicle main events to all parties, e.g., users and fleet managers, which may help in solving any related claim with efficient process. Thus, the system may eliminate some of the false legal cases against OEMs, such as when a user claims wrong "vehicle action" without mentioning or knowing sensor modification by unauthorized person(s) and/or without conducting the required test. This system also may be used to help field investigations in defining the correct information and history of impaired conditions. Generally, the systems described herein develop blockchain to produce incorruptible and authenticated records that may protect the customer, OEM, and/or public from impaired driving.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination to form additional hybrid implementations of the present disclosure. For example, any of the functionality described with respect to a particular device/component may be performed by another device/component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art.

Referring now to FIG. 1, network system 100 is provided that may be employed for determining whether a driver of a vehicle is impaired, e.g., inebriated, and deactivating the vehicle if the driver is determined to be impaired. Network system 100 operates as a distributed computer network that allows various types of computing devices to interact with each other via blockchain network 150. The example devices shown in FIG. 1 include vehicle 200 having exterior sensors 202, interior sensors 204, alcohol interlock sensors 206, e.g., NHTSA sensors, and control module 208, user device 210, and fleet manager device 212. Moreover, system 100 may include an OEM device (not shown). In some instances, the fleet manager may be the OEM. Some, or all, of these devices, may be Internet of Things (IoT) devices that are configured to communicate with each other via blockchain network 150. Exterior sensors 202 and/or interior sensors 204 may include, for example, one or more cameras on/in vehicle 200. A few examples of user device 210 and/or fleet manager device 212 may include cellular phones, pagers, laptop computers, and tablet computers that can share information with the various devices of system 100.

Network system 100 may be a peer-to-peer network that supports a distributed ledger 201. In general, distributed ledger 201 offers a consensus of replicated, shared, and synchronized digital data geographically spread out over system 100. There is no designated administrator or centralized data storage system. As shown in FIG. 1, each device in system 100 may include the same ledger, e.g., ledger 201, and consented the digital smart contract, and may each enter and update ledger 201 in a manner as described in further detail below. Although FIG. 1 shows ledger 201 integrated with each device in system 201, ledger 201 may be depicted as part of network 150, such that each device enters and updates ledger 201 via network 150. Thus, distributed ledger 201 may be implemented by configuring various databases of various devices in system 100, and/or in a cloud computing system of network 150 to record data associated with transactions regarding whether the driver of the vehicle is impaired that are provided by the devices coupled to network 150. Various types of algorithms may be employed to ensure that the data in ledger 201 is authentic, timely, non-redundant, and is updated in real time. More so, various other devices, such as infrastructure devices (e.g., cameras/sensors), roadside units, servers, etc. may be incorporated into the system 100.

Each device of system 100 may include a wallet having an identifier unique to the device, e.g., encrypted with specific passwords (private key). For example, exterior sensors 202 may include wallet 203 with an identifier unique to exterior sensors 202, interior sensors 204 may include wallet 205 with an identifier unique to interior sensors 204, alcohol interlock sensors 206 may include wallet 207 with an identifier unique to alcohol interlock sensors 206, control module 208 may include wallet 209 with an identifier unique to control module 208, user device 210 may include wallet 211 with an identifier unique to user device 210, and fleet manager device 212 may include wallet 213 with an identifier unique to fleet manager device 212. Accordingly, each individual device of system 100 may have the capability to know each other via, e.g., Handshaking, utilizing the encrypted digitized serial numbers of sensors, modules, user's ID, and Fleet manager digital key, stored in the respective wallets.

Vehicle 200 may be a manually driven vehicle (e.g., no autonomy) and/or configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4. A vehicle having a Level-0 autonomous automation may not include autonomous driving features. An autonomous vehicle (AV) having Level-1 autonomy may include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomous vehicles can operate independently from a human driver, but may still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls. According to embodiments of the present disclosure, vehicle 200 may be a vehicle having a Level-4 or Level-5 autonomous vehicle controller.

Control module 208 may be configured as a server computer to a number of clients such as the devices shown in FIG. 1. In an exemplary mode of operation of system 100, information about whether a driver of vehicle 200 is impaired may be transmitted to control module 208 from each of the devices of system 100, such that control module 208 may deactivate vehicle 208 upon the determination that the driver is impaired.

Blockchain network 150 is a distributed communications network that allows the various devices to wirelessly communicate with the each other and pass information back and forth in the form of digital data pertaining to various transactions conducted by the devices of system 100. Each device may be configured as a wireless node of blockchain network 150 and may, in at least some implementations, utilize any of various types of wireless communication formats (WiFi, Bluetooth, cellular, etc.).

In an example implementation, information about whether a driver of the vehicle is impaired may be entered into distributed ledger 201 by a first device of system 100, e.g., alcohol interlock sensor 206. The information provided by alcohol interlock sensor 206 may be validated by information entered into ledger 201 by one or more other devices of system 100, e.g., exterior sensor 202 and/or interior sensor 204. Information subsequently entered into ledger 201 via, e.g., user device 210 and/or fleet manager device 212, may result in the previous information submitted by exterior sensor 202, interior sensor 204, and/or alcohol interlock sensor 206 to be modified, deleted, or further validated.

All nodes of system 100 may share a smart contract that have at least two functions. The first function may be a test for impaired events, e.g., an impaired driver, where each node may transmit its impaired event results, each node may approve its transmitted messages, and every node may update its own ledger copy with the new transmitted and approved messages. The second function may be to log impaired changes or modifications. As a security protocol, only higher level authorized nodes, e.g., fleet manager device 212 or an OEM device operatively coupled to system 100, may be allowed to modify or change any of the sensors or modules on vehicle 200, and they may update distributed ledger 201 with any modifications to all nodes, including the added or modified ones.

In another example implementation, distributed ledger 201 may be configured to support a blockchain mode of operation that establishes a sequence of timestamped events associated with determining whether a driver is impaired. A blockchain in this application may be generally described as a growing list of records, called blocks, which are linked using cryptography. Each block contains a cryptographic hash of the previous block, a timestamp, and transaction data. By design, a blockchain is resistant to modification of the data and allows recording of events in a verifiable and permanent manner. Timestamping of information provided by one of the various devices of system 100 allows the other devices of system 100 to verify a timeliness, authenticity, and originating source, of information that may be used to determine whether a driver is impaired, and to deactivate the vehicle.

Figure 2:
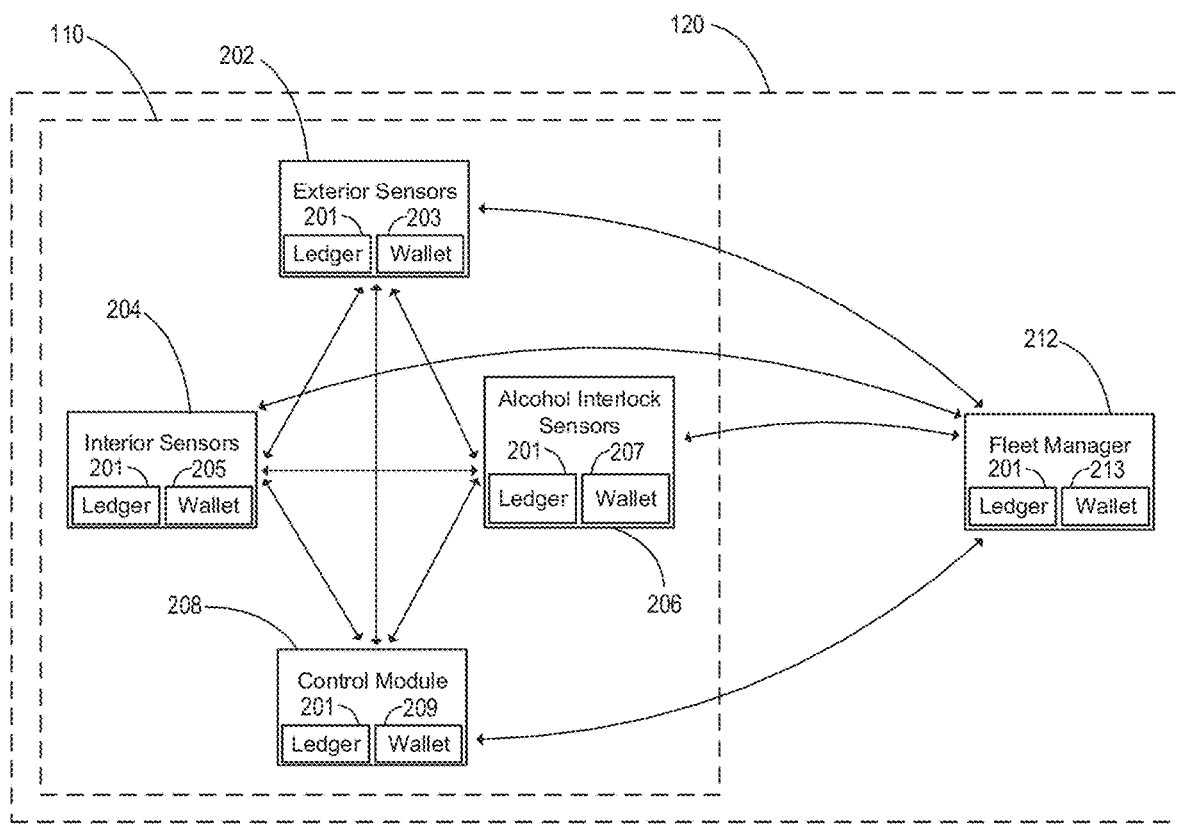
FIG. 2 illustrates a decentralized loop architecture for the components of the system in accordance with the principles of the present disclosure.

For example, as shown in FIG. 2, the decentralized loop architecture of two main blockchains are illustrated. Vehicle blockchain 110 includes the vehicle nodes, e.g., exterior sensor 202, interior sensor 204, alcohol interlock sensors 206, and control module 208, and exterior blockchain 120 includes exterior nodes, e.g., user device 210 or an OEM device (not shown) and/or fleet manager device 212, in addition to the vehicle nodes.

Figure 3:
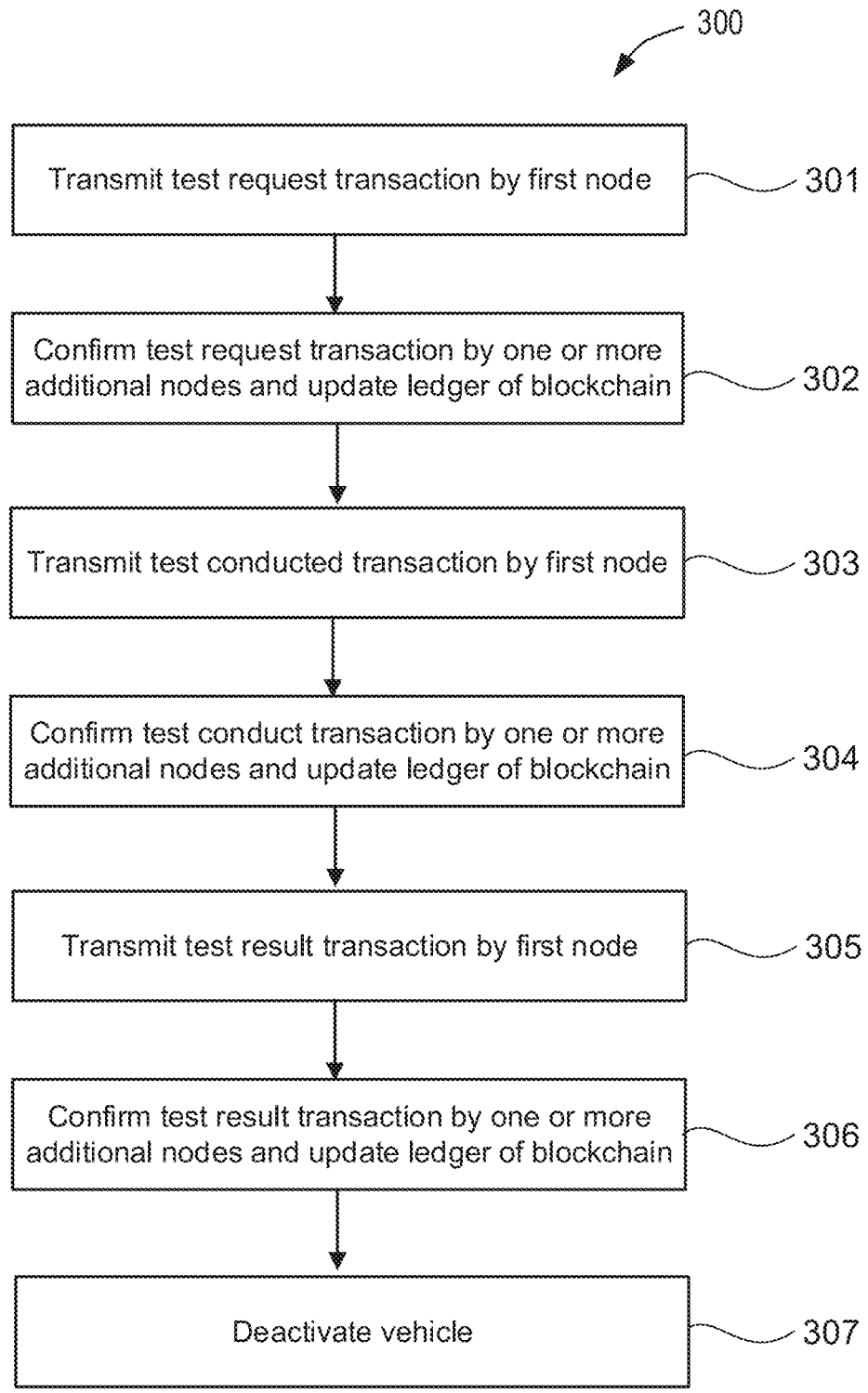
FIG. 3 is a flow chart illustrating exemplary steps for securing limited drivability of a vehicle by impaired drivers using a blockchain mode of operation in accordance with the principles of the present disclosure.

FIG. 3 shows a flow chart illustrating exemplary steps of method 300 for securing limited drivability of a vehicle by impaired drivers using a blockchain mode of operation in accordance with the principles of the present disclosure. Some of the steps of method 300 may be further elaborated by referring to FIGS. 4A to 4E. For example, FIG. 4A illustrates an initial ledger of system 100 having initial conditions (ICs). As shown in FIG. 4A, the nodes may include alcohol interlock sensor 206, e.g., NHTSA sensor, interior sensors 204, exterior sensors 202, and fleet manager device 212. The ledger further may indicate any requests to be registered and shared by each node, as well as notes. The initialization or resetting of the ledger may be referenced to local or time, e.g., at the beginning of every shift, or day, ignition cycle (ON/OFF). Accordingly, the ICs are initially free of impaired event data, as no impaired test driver has been requested or registered yet.

The digitization and coding of the impaired driver events may be classified as needed. Illustratively, as shown in FIG. 4A, the ICs code for each node may include three digits (shown as 000 in FIG. 4A). For example, the first digit may be binary, e.g., 0 or 1, where 0 indicates that a test of whether the driver of the vehicle is impaired has not been requested, and 1 indicates that a test of whether the driver of the vehicle is impaired has been requested. Moreover, the second digit may be binary, e.g., 0 or 1, where 0 indicates that a test of whether the driver of the vehicle is impaired has not been conducted, and 1 indicates that a test of whether the driver of the vehicle is impaired has been conducted. The third digit may be binary, e.g., 0 or 1, where 0 indicates that an impaired event has not been detected, e.g., the driver is not determined to be impaired, and 1 indicates that an impaired event has been detected, e.g., the driver is determined to be impaired. Initially, ICs will be 000 for all nodes.

To build a block on the chain, the following three transactions may be transmitted and verified/confirmed by the nodes on the chain: TEST REQUEST, TEST CONDUCTED, and TEST RESULTS. These transactions may be published on a limited "controlled" blockchain. As shown in FIG. 4A, each transaction is depicted as a two digit code. For example, TEST REQUEST is depicted in FIG. 4A as the first pair of 00, TEST CONDUCTED is depicted as the second pair of 00, and TEST RESULTS is depicted as the third pair of 00, for each node (above the 000). For each transaction, the transaction may be transmitted by a first of the nodes, and then subsequently verified/confirmed by another one of the nodes, different from the first node that transmitted the transaction. Accordingly, the first digit of the two digit code for each transaction may be binary, e.g., 0 or 1, where 0 indicates the transaction has not been transmitted, and 1 indicates that the transaction has been transmitted. Moreover, the second digit of the two digit code for each transaction may be binary, e.g., 0 or 1, where 0 indicates the transaction has not been verified, and 1 indicates that the transaction has been verified. The possible configurations for each transaction are 11, 10, 01, and 00.

Referring again to FIG. 3, at step 301, a TEST REQUEST transaction may be transmitted by a first node, e.g., alcohol interlock sensors 206. For example, alcohol interlock sensors 206 may transmit TEST REQUEST=1, indicating that the TEST REQUEST transaction has been transmitted. Upon receipt of the message by, e.g., control module 208, control module 208 may wake up the other sensors, exterior sensors 202 and/or interior sensors 204, if they are not already awake, such that exterior sensors 202 and/or interior sensors 204 may evaluate the TEST REQUEST state by confirming whether there is a known or unknown person in the test area, e.g., whether the driver is in the driver seat adjacent to alcohol interlock sensors 206. Upon confirmation by any one of exterior sensors 202, interior sensors 204, or fleet manager device 212, that the transaction was requested at step 302, e.g., by the presence of the driver of the vehicle, the confirming device may transmit TEST REQUEST=11, where the second 1 indicates that the TEST REQUEST transaction has been verified, and the ledger is updated accordingly as shown in FIG. 4B. As shown in FIG. 4B, the TEST REQUEST is depicted as 11 for each node, and the three digit ICs is depicted as 100 for each node, and the ledger notes that the TEST REQUEST transaction was requested and validated from a person in the test area. All nodes have a copy of this updated record that shows the test is requested and status is updated.

If none of the nodes, e.g., exterior sensors 202, interior sensors 204, or fleet manager device 212, are able to confirm that the TEST REQUEST transaction was requested, e.g., no driver is detected in the test area adjacent to alcohol interlock sensor 206, any one of the nodes may transmit TEST REQUEST=10, where the second 0 indicates that the TEST REQUEST transaction has not been verified, and the ledger is updated accordingly as shown in FIG. 4C. As shown in FIG. 4C, the TEST REQUEST is depicted as 10 for each node, and the three digit ICs is depicted as 000 for each node, indicating that a test of whether the driver of the vehicle is impaired has not been requested. Moreover, the ledger notes that the TEST REQUEST transaction was requested but no person was confirmed in the test area. This event may be indicative of an unauthorized person attempting to hack the system and send a message while the person is not in the vehicle or in the test area. For example, the unauthorized person may have been able to transmit the request for the test; however, upon mining to authenticate the request, the other nodes were not able to confirm that the person requesting the test is in the test area, e.g., the driver's seat. An alert may be generated and transmitted by one of the nodes, e.g., to control module 208, such that the source of the request may be re-evaluated.

At step 303, a TEST CONDUCTED transaction may be transmitted by any node, e.g., alcohol interlock sensors 206, to establish that the test has been conducted. For example, alcohol interlock sensors 206 may transmit TEST CONDUCTED=1, indicating that the TEST CONDUCTED transaction has been transmitted. Upon receipt of the message, another node may evaluate the TEST CONDUCTED state by confirming whether test has been conducted. Upon confirmation by any one of exterior sensors 202, interior sensors 204, control module 208, or fleet manager device 212, that the test was conducted at step 304, the confirming device may transmit TEST CONDUCTED=11, where the second 1 indicates that the TEST CONDUCTED transaction has been verified, e.g., a test was conducted, and the ledger is updated accordingly as shown in FIG. 4D. As shown in FIG. 4D, the TEST CONDUCTED is depicted as 11 for each node, and the three digit ICs is depicted as 110 for each node, and the ledger notes that the test was conducted and validated by at least one of the other sensors/modules/devices.

At step 305, a TEST RESULT transaction may be transmitted by alcohol interlock sensors 206 to establish whether the driver of the vehicle is impaired. For example, alcohol interlock sensors 206 may transmit TEST RESULT=1, indicating that the TEST RESULT transaction has been transmitted. Upon receipt of the message, another node may evaluate the TEST RESULT state by confirming the result of the test. Upon confirmation by any one of exterior sensors 202, interior sensors 204, control module 208, or fleet manager device 212, that the driver is impaired at step 306, the confirming device may transmit TEST RESULT=11, where the second 1 indicates that the TEST RESULT transaction has been verified, e.g., the driver is impaired, and the ledger is updated accordingly as shown in FIG. 4E. As shown in FIG. 4E, the TEST RESULT is depicted as 11 for each node, and the final three digit ICs is depicted as 111 for each node, and the ledger notes that the results were sent and authenticated. Accordingly, at step 307, control module 208 may deactivate vehicle 200 to prevent the impaired driver from operating vehicle 200.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, and/or wireless data links) through a network, both perform tasks. In a distributed system environment, program modules may be located in both the local and remote memory storage devices.

Further, where appropriate, the functions described herein may be performed in one or more of hardware, software, firmware, digital components, or analog components. For example, one or more application specific integrated circuits (ASICs) may be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed:

1. A method comprising:
   configuring a first sensor operatively coupled to a vehicle as a first wireless node of a blockchain network;
   configuring a second sensor operatively coupled to the vehicle as a second wireless node of the blockchain network;
   configuring a control module of the vehicle as a third wireless node of the blockchain network;
   detecting, by the first sensor, whether a driver of the vehicle is impaired;
   conveying, by the first sensor, to the control module, digital data indicative of whether the driver is impaired;
   conveying, by the control module, to the second sensor, the digital data indicative of whether the driver is impaired; and
   deactivating, by the control module, the vehicle if the driver is impaired.

2. The method of claim 1, wherein each of the first sensor, the second sensor, and the control module comprises a wallet comprising unique identifier.

3. The method of claim 1, wherein first sensor is an alcohol interlock sensor.

4. The method of claim 1, wherein the second sensor comprises at least one of one or more exterior sensors or one or more interior sensors operatively coupled to the vehicle.

5. The method of claim 1, wherein the blockchain network is configured to support a distributed computer system that includes the first sensor, the second sensor, and the control module, the method further comprising:
   entering, by the first sensor, the second sensor, and the control module, into a distributed ledger of the distributed computer system, the digital data indicative of whether the driver is impaired.

6. The method of claim 5, wherein the distributed ledger is configured to support a blockchain mode of operation that establishes a sequence of timestamped events associated with detecting whether the driver of the vehicle is impaired.

7. The method of claim 1, further comprising:
   requesting, by the first or second sensor, a test of whether the driver of the vehicle is impaired;
   confirming, by the first or second sensor, that the test was requested by the driver of the vehicle;
   establishing, by the first or second sensor, whether the test of whether the driver of the vehicle is impaired has taken place;
   confirming, by the first or second sensor, that the test of whether the driver of the vehicle is impaired has taken place;
   providing, by the first sensor, a result of the test of whether the driver of the vehicle is impaired; and
   confirming, by the second sensor, that the driver is impaired.

8. The method of claim 1, further comprising configuring a user device as a fourth wireless node of the blockchain network; and
   conveying, by the control module, to the user device, the digital data indicative of whether the driver is impaired.

9. The method of claim 1, further comprising configuring a fleet manager device as a fourth wireless node of the blockchain network; and
   conveying, by the control module, to the fleet manager device, the digital data indicative of whether the driver is impaired.

10. A method comprising:
    entering, into a distributed ledger of a distributed computer system, by a first sensor operatively coupled to a vehicle, digital data indicative of a request regarding whether a driver of the vehicle is impaired;
    entering, into the distributed ledger of the distributed computer system, by a second sensor operatively coupled to the vehicle, digital data indicative of confirmation of whether the driver of the vehicle is impaired;
    accessing, by a control module of the vehicle, the distributed ledger to obtain information of whether the driver of the vehicle is impaired; and
    deactivating, by the control module, the vehicle if the driver is impaired,
    wherein, if the digital data indicative of confirmation of whether the driver of the vehicle is impaired indicates an attempted hacking event, the method further comprises generating, by the second sensor, an alert.

11. The method of claim 10, wherein first sensor is an alcohol interlock sensor.

12. The method of claim 10, wherein the second sensor comprises at least one of one or more exterior sensors or one or more interior sensors operatively coupled to the vehicle.

13. The method of claim 10, further comprising accessing, by a user device, the distributed ledger to obtain information of whether the driver of the vehicle is impaired.

14. The method of claim 10, further comprising accessing, by a fleet manager device, the distributed ledger to obtain information of whether the driver of the vehicle is impaired.

* * * * *